Sept. 28, 1937.    L. D. DRAKE    2,094,004
APPARATUS FOR DIFFUSION AND MIXING FLUIDS AND SOLIDS
Filed Oct. 28, 1935    2 Sheets-Sheet 1
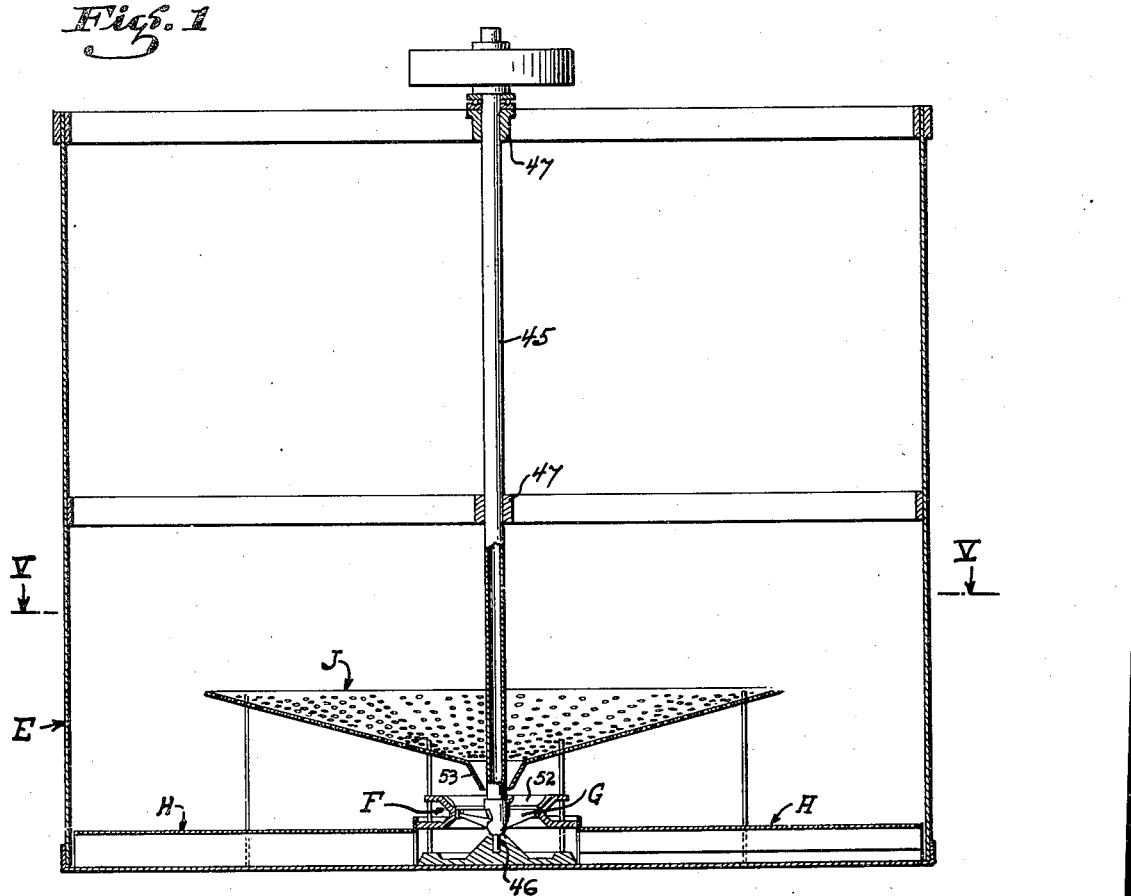
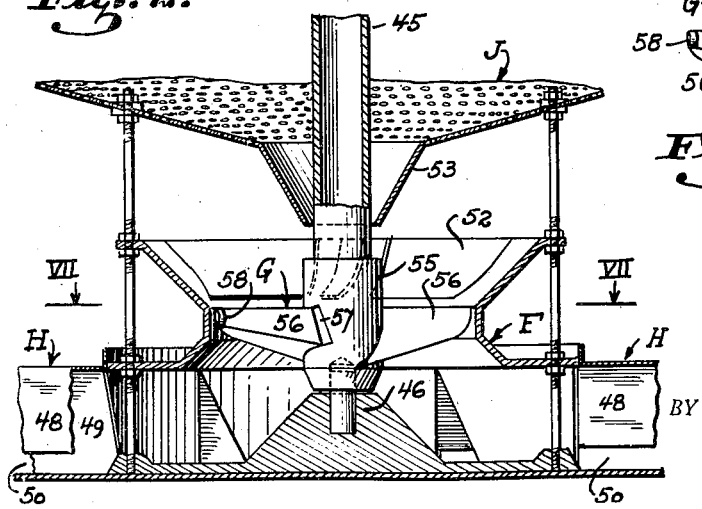
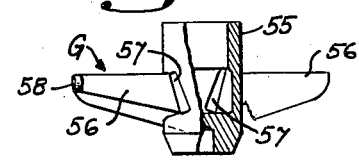
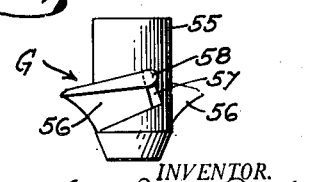
INVENTOR.
Lewis Driver Drake.
BY
Chas. E. Townsend.
ATTORNEY.

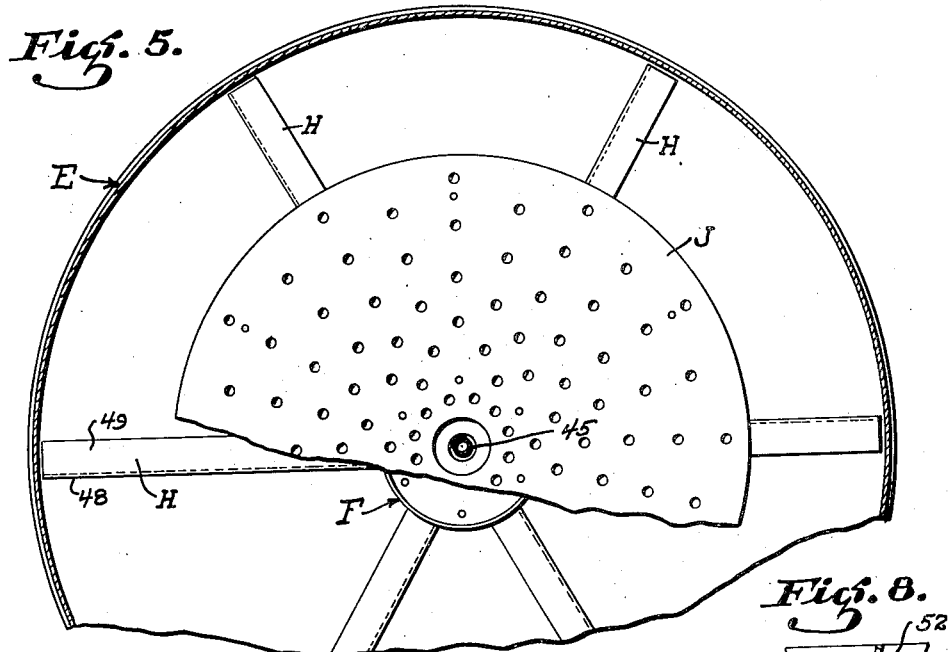
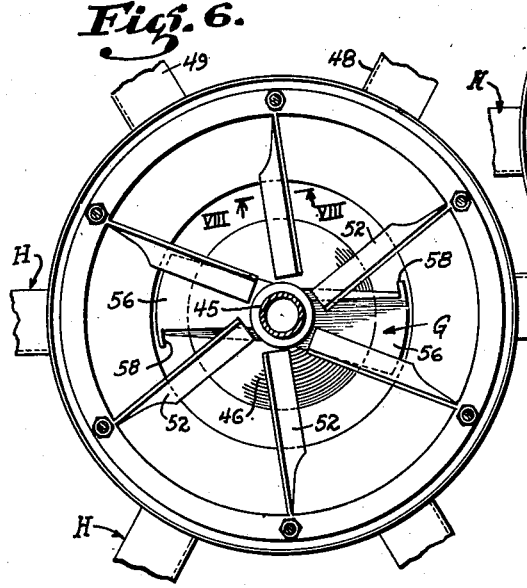
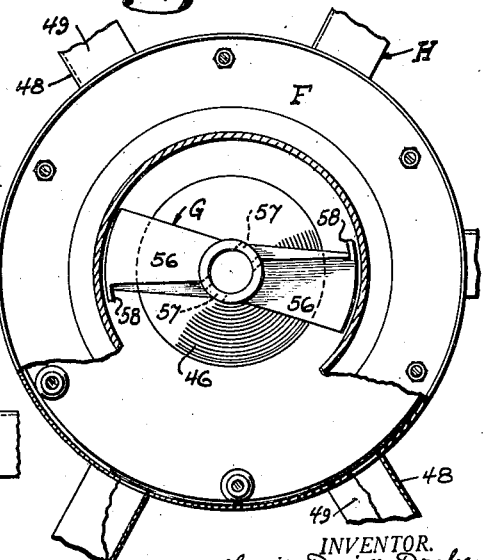

Patented Sept. 28, 1937

2,094,004

UNITED STATES PATENT OFFICE 2,094,004

APPARATUS FOR DIFFUSION AND MIXING FLUIDS AND SOLIDS

Lewis Driver Drake, Mountain View, Calif.

Application October 28, 1935, Serial No. 46,982

14 Claims. (Cl. 261—87)

This invention relates to an apparatus whereby thorough diffusion and mixing of two or more fluids or fluids and solids may be insured; the present application being a modification of the application disclosed in my co-pending application entitled "Diffusion impeller deflector" filed August 29th, 1934, Serial Number 742,016.

There are many operations in the metallurgical, chemical and biological fields which require thorough diffusion and mixing of one or more fluid substances or fluids and solids. Among such operations may be mentioned ore flotation, cyanidation, aeration of sewage and yeast malt, carbonation of sugar beet juice, and saline solutions in the manufacture of certain alkalis, etc.

The above operations require introduction and mixing of a gaseous substance with a liquid or liquids and gases with solids, but in other operations, for instance in the purification of water, chemicals in solution are mixed with the water to lower the bacteria content, to reduce algae growths, etc. In the latter instance a liquid is introduced into a liquid, but, even so, thorough diffusion or mixing is necessary to obtain the best results. In other instances, for instance, in sewage treatment and in the manufacture of yeast air is introduced into a liquid carrying solids. Here thorough mixing and diffusion of the liquid and air and solids is exceedingly essential, as the action of the air on the material is both chemical and biological.

The object of the present invention is generally to improve and simplify the construction and operation of apparatus whereby thorough diffusion or mixing of two or more fluid substances or fluids and solids may be insured; to provide an apparatus for the purpose described which is simple, compact and substantial in construction; to provide an apparatus for the purpose described in which the power consumption is reduced to a minimum; to provide an apparatus whereby materials varying widely in physical and chemical character may be efficiently handled; and, further, to provide an apparatus which is efficient in operation.

The invention is shown by way of illustration in the accompanying drawings, in which—

Fig. 1 is a central, vertical section of the apparatus;

Fig. 2 is an enlarged section of the impeller housing, said view also showing the suction diffusion mechanism and the discharge deflecting or diffusion mechanism;

Fig. 3 is a side elevation of the impeller, said view being partially in section;

Fig. 4 is a view taken at right angles to Fig. 3;

Fig. 5 is a plan section taken on line V—V of Fig. 1, said view being partially broken away;

Fig. 6 is a plan view of the impeller housing;

Fig. 7 is a plan view in section of the impeller housing taken on line VII—VII of Fig. 2, said view being partially broken away;

Fig. 8 is a cross section taken on line VIII—VIII of Fig. 6;

Fig. 9 is a cross section of one of the section diffusion arms;

Fig. 10 is a similar section showing a modified shape of the suction diffusion arm.

Referring to the drawings in detail, and particularly Figs. 1 and 2, E indicates a flat bottom tank of suitable diameter and height depending upon the quantity and kind of material to be treated. Mounted adjacent or supported on the bottom of the tank is a housing F, which will hereinafter be referred to as the impeller housing. Disposed centrally of the tank and extending downwardly into the housing is a tubular or hollow shaft 45 and secured thereon is an impeller generally indicated at G; a step bearing 46 being disposed below the impeller to center the impeller and the shaft and the usual bearings being otherwise provided, as indicated at 47, to guide and support the shaft vertically.

The lower portion of the impeller housing is substantially cylindrical in shape and forms a suction inlet to the impeller. Connected with said housing and extending radially therefrom are a plurality of suction arms H. In cross section these arms are shaped, as shown in Figs. 9 and 10, that is, they present a vertical surface 48 on one side and a sloping surface 49 on the opposite side. A continuous opening, or one or more openings 50, is formed in the vertical face of each arm and adjacent the bottom of the container to function as intake openings to the arms, as will hereinafter be described. The arms are closed at their outer ends but their inner ends are open and in communication with the suction side or inlet of the impeller housing, hence when the apparatus is in operation the material being treated will enter through the openings 50 and will then pass longitudinally through the arms into the suction portion of the housing F and will then enter the impeller and will be discharged from the housing in an upward direction. The position and arrangement of the suction arms is an important feature of the present invention as it provides means whereby solids or other material tending to settle toward the bottom will be continuously removed from the entire bottom area so as to be circulated by the impeller and directed thereby upwardly through the tank to again settle or to be re-circulated.

The upper portion of the housing is cone-shaped and flared outwardly to form an expanded discharge opening and guide vanes are placed in the expanded open end of the housing as indicated at 52, said vanes serving two functions; first, that of taking the objectionable swirl out of the material as it is being discharged upwardly between the blades; and, secondly, that of diffusing or spreading the discharging liquid before it engages a deflector plate generally indicated at J. While it has been stated that one of the functions of the vanes or blades 52 is that of taking most of the swirl out of the upwardly discharging fluid medium or material being handled, it does not take all of the swirl out as a slight swirl is desirable as will hereinafter appear. The fluid or liquid discharging upwardly through the upper end of the impeller housing, after leaving the guide vanes 52, impinges against a cone-shaped deflector 53 and the main deflector J; the smaller deflector 53 merely aiding in starting deflection of the fluid or liquid material before it impacts with the deflector J. This, as previously stated, is preferably cone-shaped and it is perforated so that a certain proportion of the liquid or fluid medium being treated may discharge upwardly through the same; the perforations being of such a size and so spaced that a certain proportion will be deflected outwardly beyond the outer peripheral edge of the deflector so as to substantially reach the inner surface of the container. By this arrangement uniform diffusion is secured throughout substantially the entire area of the tank as the material travels upwardly and as it settles toward the bottom uniform suction diffusion is insured by the extended suction arms H, which gather the material from the entire bottom area of the container, hence there is uniform diffusion on the discharge side and uniform diffusion on the suction side of the impelling mechanism.

Any suitable form of impeller may be employed, but preferably the type here shown. The impeller consists of a hub member 55 which is screwed, or otherwise secured, to the lower end of the shaft 45. The hub is hollow and it is provided with two impeller blades indicated at 56. These blades are solid and wedge-shaped in cross section, as clearly shown in Fig. 4. Their upper surface presents a uniform pitch from end to end and in that respect is similar to a ship's propeller, and meaning the discharge of the impeller advances the same mathematical distance or pitch on all parts of the impelling fixed face of the blade, this being done by making the impelling fixed face of the blade part of a helicoidal surface coaxial with the impeller of varying decreasing, not uniform angle, from the hub to the outer end of the blade. The impeller of the present invention distinguishes from such propellers by increasing in thickness from the leading edge to the rear edge and in presenting a surface at the rear edge which is disposed substantially at right angles to the impelling surface. By this construction a cavitation pocket is formed behind each blade and this pocket is supplied with fluid through ports formed in the hub and indicated at 57, said ports being arranged at the inner ends of the impeller blades in direct alignment with the cavitation pockets formed behind the blades; hence when the impeller is in operation air, or whatever medium it is desired to introduce and mix with the material treated, is sucked down through the hollow shaft into the hub and it passes from the ports 57 to the cavitation pockets formed behind the rear edges of the blades. Lugs, or ears, are formed on the outer ends of the blades, as indicated at 58, and these are of a shape substantially identical to the cavitation pockets formed behind the blades and serve the function of preventing the fluid medium supplied to the cavitation pockets from escaping at the ends of the blades. It will be seen that the uniform pitch of the impelling face of the impeller blade produces a substantially uniform, unshattered discharge upwardly.

In actual practice let it be assumed that the tank or container E is filled with yeast mash and that yeast is the final product to be obtained. In this instance the tank will be filled with the yeast mash and, when the impeller is started, the mash will enter the suction arms H through the openings 50. It will then pass longitudinally of the arms into the suction side of the impeller housing, and it will then be picked up by the impeller and discharged through, or between, the vanes 52 upwardly against the diffusion deflector J. As the liquid is being impelled upwardly by means of the impeller, cavitation pockets are formed behind the same and air will enter through the hollow shaft and pass through the hub and the ports formed therein and, as such, will be supplied to the cavitation pockets and will escape therefrom in the form of bubbles which will be broken up by the rotation of the impeller blades. The air, or other medium introduced, is thus thoroughly mixed and diffused with the liquid containing the yeast mash, and this mixture will partially pass through the perforations in the deflector J and will be partially diverted in an outward direction by the same. The angle of the deflector and the size and number of perforations being such that there will be a uniform distribution throughout the entire area of the tank, the return action being similarly uniform and covering the entire area of the bottom of the tank as the suction arms extend radially in every direction over the bottom of the tank and as such gather the material from the entire bottom area; hence there is an efficient discharge diffusion and just as efficient suction diffusion, insuring that all material throughout the entire area is maintained in continuous circulation and also insuring a thorough aeration of the material being treated. The air introduced in this manner has probably both a chemical and a biological action as experience has taught that thorough aeration of the yeast mash is exceedingly essential during the generating or growth of the yeast and it has also been found that the greater the contact area between the air and the growing yeast the quicker the transformation, and this object is obtained by the present structure as the air admitted is supplied in ample volume and it is thoroughly broken up into small bubbles, thereby spreading it over the largest area possible.

It was previously stated that while the vanes 52 served one function, to-wit, that of taking most of the swirl out of the upwardly discharging liquid or fluid medium that it did not take all of the swirl; hence as the liquid or fluid medium is rising in the tank it is swirling causing the air bubbles to rise in a spiral path and as such maintains a longer contact period. This swirling action is also of importance in returning any matter tending to settle, as when the settling matter reaches the bottom it impinges against the vertical faces 48 of the arms and as such is directed against the intake openings 50 of the arms, there being no tendency of the solid matter to gather behind the arms as their rear faces are sloping and as the swirling current will sweep the bottom clean between the arms and, accordingly, directs the settling substance to the openings formed in the vertical surfaces of the arms. It is for this reason that a slight swirling action is desirable.

An apparatus constructed and operated as here disclosed is particularly efficient in diffusing and mixing substances having a wide range of viscosity, density and specific gravity, and also for handling low density fluids containing slow settling solids and, as such, is ideally suited for sewage treatment, yeast manufacture, etc. Flat bottom tanks are ideal for these conditions due to the diffused suction arrangement employed. Cone-shaped bottom tanks may also be employed for certain cyanide work and flotation and other uses.

In flotation work the function of the air is primarily a physical one, as it serves the purpose of carrying or floating the concentrates to the surface in the form of a froth. In this type of work uniform control diffusion below the froth collecting surface is desirable.

In cyanide plants the purpose of admitting air and mixing it with the pulp and solution is primarily a chemical one, and with some ores and concentrates it has been found that the dissolving action of the cyanide upon the mineral content is in proportion to the rate at which the oxygen can be supplied, and not only that but thorough mixing of the air supplying the oxygen with the solution is essential so as to bring about the greatest contact area possible.

The oxygen absorption in some cyanide work appears a matter of surface contact. The finer the bubble the greater the surface area, and the more uniform the distribution of the air the faster the reaction. With the air delivered in large or coarse bubbles the contact surface area is reduced and the dissolving action is materially slower.

In sewage treatment the purpose of the air is primarily to supply oxygen to promote the growth of bacteria whereby decomposition of the sewage takes place. In a yeast mash the purpose of the air is probably both chemical and biological.

The efficiency obtained by the present apparatus in chemical and biological work, and like uses, is the result of the fine subdivision of air obtained by the method of admitting it behind the impeller blades and the mixing action obtained by said blades and the deflectors and vanes cooperating therewith. By this fine subdivision of the air and uniform mixture of solids and dissemination thereof the reaction, whether chemical or biological, is promoted and the time usually required for such operations is materially reduced.

In some sewage and other work, probably due to colloidal action, it appears that the oxygen absorption penetrates only to a thin film around each bubble and as these bubbles rise to the surface and break, they leave a concentrated layer of oxygen supersaturated fluid at the surface with little oxygen absorption below. In such cases to make a thorough diffusion of absorbed oxygen through the entire charge it is necessary to diffuse the surface concentrates through the entire charge by rough surface downward circulation. The time of contact is a usual factor in most biological and chemical actions, hence a spiral rising bubble has a longer contact than one rising vertically. It is for this reason that where long contact is desired, a mild circular or swirling motion of the charge is maintained; this being insured by proper adjustment of the angle of the guide vanes 52.

Variations in viscosity and density, as well as depth of the liquid may require modification of the apparatus. Diffusion at two feet and at twelve feet, or greater depth, will obviously differ. In aeration under both of the above conditions the diffused air leaves the impeller blades at, or below, atmospheric pressure, but is immediately compressed by the weight of the column of the fluid above it. The amount of that compression varies the impeller deflector structure. An impeller having a true pitch impelling blade surface with abrupt cavitation forming rear edges at the horizontal upper discharge edge will impel the fluid at the same speed over the entire surface, causing the discharge near center of the tank to rise centrally, then by impingement or deflection to flow upwardly and outwardly, then to settle downwardly. An impeller blade having a variable pitch surface, such as disclosed in my copending application, can be made to serve the same purpose but due to the variable pitch effect the power consumption becomes higher and the work less efficient.

Where the fluid in the tank contains quicker settling solids, such as crushed ore, a cone-shaped bottom is desirable to guide these settling solids back into the zone of suction of the impeller where they are picked up and recirculated. Where the fluid in the tank contains slow settling solids, as activated sewage and yeast mash, flat bottom tanks are used but the diffusion suction arrangement here illustrated will be required to maintain active circulation throughout the entire area of the tank. The higher efficiency of this diffusion equipment in chemical, biological, and chemical biological work and like uses is the result of finer subdivision of air, giving greater surface contact and more nearly keeping all the elements necessary to a reaction present at all points of the reaction all the time by more uniform diffusion.

While these and other features of the invention have been more or less specifically described and illustrated, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is:—

1. An apparatus of the character described comprising a container for the reception of a liquid containing a substance to be treated with a fluid medium, a housing disposed adjacent the bottom of the container, said housing having a suction opening at the bottom and a discharge opening at the top, an impeller in the housing whereby continuous circulation of the liquid and the substance carried thereby is maintained and whereby the fluid medium is introduced and mixed with the liquid and the substance carried thereby, and a plurality of radially extending arms disposed adjacent the bottom of the container and connected with the suction opening of the impeller housing, said arms being hollow and presenting openings extending over a large area of the bottom of the container so as to maintain continuous circulation of all of the liquid and the substance carried thereby throughout the container.

2. An apparatus of the character described comprising a container for the reception of a liquid carrying solid matter to be treated with a fluid medium, a housing disposed adjacent the bottom of the container, said housing having a suction opening and a discharge opening, an impeller in the housing whereby continuous circulation of the liquid and solid matter is maintained and whereby the fluid medium is introduced and mixed with the liquid and solids, and a plurality of radially extending arms disposed adjacent the bottom of the container and connected with the suction opening of the impeller housing, said arms being hollow and presenting openings whereby liquid and solid matter settling toward the bottom will enter the arms and will be delivered to the suction side of the impeller for recirculation.

3. An apparatus of the character described comprising a container for the reception of a liquid carrying solid matter to be treated with a fluid medium, a housing disposed adjacent the bottom of the container, said housing having a suction opening and a discharge opening, an impeller in the housing whereby continuous circulation of the liquid and solid matter is maintained and whereby the fluid medium is introduced and mixed with the liquid and solids, and a plurality of radially extending arms disposed adjacent the bottom of the container and connected with the suction opening of the impeller housing, said arms being hollow and presenting openings extending substantially from end to end thereof, whereby liquid and solid matter settling toward the bottom of the container will enter the arms and will be delivered to the suction side of the impeller for recirculation.

4. An apparatus of the character described comprising a container for the reception of a liquid carrying solid matter to be treated with a fluid medium, a housing disposed adjacent the bottom of the container, said housing having a suction opening and a discharge opening, an impeller in the housing whereby continuous circulation of the liquid and solid matter is maintained and whereby the fluid medium is introduced and mixed with the liquid and solids, a plurality of radially extending arms disposed adjacent the bottom of the container and connected with the suction opening of the impeller housing and one side of each arm presenting a substantially vertical face having openings formed therein, said vertical faces collecting solid matter settling toward the bottom and directing said solid matter, together with the liquid, through the openings into the hollow arms and delivering the liquid and the solid matter to the suction side of the impeller for recirculation.

5. An apparatus of the character described comprising a container for the reception of a liquid containing a substance to be treated with a fluid medium, a stationary housing disposed adjacent the bottom of the container, said housing having a suction opening and a discharge opening formed therein, an impeller in the housing whereby continuous circulation of the liquid and the substance carried thereby is maintained and whereby the fluid medium is introduced and mixed with the liquid and the substance carried thereby, the suction opening being located below the impeller and a discharge opening being arranged immediately above the impeller, and means totally submerged in the liquid and disposed above and extending laterally beyond the discharge opening of the impeller housing whereby the fluids and the substance carried thereby are distributed in a controlled upward diffusion and downward circulation throughout the entire area of the container.

6. An apparatus of the character described comprising a container for the reception of a liquid containing a substance to be treated with a fluid medium, a stationary housing disposed adjacent the bottom of the container, said housing having a suction opening and a discharge opening formed therein, an impeller in the housing whereby continuous circulation of the liquid and the substance carried thereby is maintained and whereby the fluid medium is introduced and mixed with the liquid and the substance carried thereby, the suction opening being located below the impeller and a discharge opening being arranged immediately above the impeller, and a perforated plate totally submerged in the liquid and disposed above and extending laterally beyond the discharge opening of the impeller housing, whereby the fluid and the substance carried thereby and discharged by the impeller are distributed in an upward direction and a controlled downward circulation maintained throughout the entire area of the container, said plate having a diameter less than the interior diameter of the container to form an annular passage between its outer peripheral edge and the inner surface of the container for said upward diffusion and the downward circulation.

7. An apparatus of the character described comprising a container for the reception of a liquid containing a substance to be treated with a fluid medium, a stationary housing disposed adjacent the bottom of the container, said housing having a suction opening and a discharge opening formed therein, an impeller in the housing whereby continuous circulation of the liquid and the substance carried thereby is maintained and whereby the fluid medium is introduced and mixed with the liquid and the substance carried thereby, and an inverted cone-shaped perforated plate submerged in the liquid and disposed above the discharge opening of the impeller housing and spaced from the walls of the container, whereby the fluids and the substance carried thereby discharged by the impeller are distributed in an upward direction and a controlled downward circulation maintained throughout the entire area of the container.

8. An apparatus of the character described comprising a container for the reception of a liquid containing a substance to be treated with a fluid medium, a housing disposed adjacent the bottom of the container, said housing having a suction opening and a discharge opening formed therein, an impeller in the housing whereby continuous circulation of the liquid and the substance carried thereby is maintained and whereby the fluid medium is introduced and mixed with the liquid and the substance carried thereby, a perforated plate submerged in the liquid and disposed above the discharge opening of the impeller housing, whereby the fluid and the substance carried thereby and discharged by the impeller is uniformly distributed in an upward direction throughout the entire area of the container, said plate having a diameter less than the interior diameter of the container to form an annular passage between its outer peripheral edge and the inner surface of the container, and a cone-shaped deflector disposed centrally of the perforated plate and below the same to function as a preliminary deflector.

9. An apparatus of the character described comprising a container for the reception of a liquid containing a substance to be treated with a fluid medium, a housing disposed adjacent the bottom of the container, said housing having a suction opening and a discharge opening formed therein, an impeller in the housing whereby continuous circulation of the liquid and the substance carried thereby is maintained and whereby the fluid medium is introduced and mixed with the liquid and the substance carried thereby, a cone-shaped perforated plate submerged in the liquid and disposed above the discharge opening of the impeller housing, whereby the fluids and the substance carried thereby discharged by the impeller is uniformly distributed in an upward direction throughout the entire area of the container, and a second cone-shaped deflector disposed centrally of the first-named cone-shaped deflector and disposed adjacent the lower surface thereof.

10. An apparatus of the character described comprising a container for the reception of a liquid containing a substance to be treated with a fluid medium, a housing disposed adjacent the bottom of the container, said housing having a suction opening at the bottom and a discharge opening at the top, an impeller in the housing whereby continuous circulation of the liquid and the substance carried thereby is maintained and whereby the fluid medium is introduced and mixed with the liquid and the substance carried thereby, a plurality of radially extending arms disposed adjacent the bottom of the container and connected with the suction opening of the impeller housing, said arms being hollow and presenting openings extending over a large area of the bottom of the container so as to maintain continuous circulation of all of the liquid and the substance carried thereby throughout the container, and means submerged in the liquid and disposed above the discharge opening of the impeller housing whereby the fluid and the substance carried thereby is uniformly distributed in an upward direction throughout the entire area of the container.

11. An apparatus of the character described comprising a container for the reception of a liquid containing a substance to be treated with a fluid medium, a housing disposed adjacent the bottom of the container, said housing having a suction opening at the bottom and a discharge opening at the top, an impeller in the housing whereby continuous circulation of the liquid and the substance carried thereby is maintained and whereby the fluid medium is introduced and mixed with the liquid and the substance carried thereby, a plurality of radially extending arms disposed adjacent the bottom of the container and connected with the suction opening of the impeller housing, said arms being hollow and presenting openings extending over a large area of the bottom of the container so as to maintain continuous circulation of all of the liquid and the substance carried thereby throughout the container, and a cone-shaped perforated plate submerged in the liquid and disposed above the discharge opening of the impeller housing whereby the fluids and the substance carried thereby discharged by the impeller are uniformly distributed in an upward direction throughout the entire area of the container.

12. In an apparatus of the character described having a container for the reception of a liquid carrying a substance to be treated with a fluid medium, an impeller rotating within a housing for maintaining the liquid and the substance carried thereby in continuous circulation within the container and for introducing and mixing the fluid medium with the liquid and the substance carried thereby, said impeller comprising a center hub member, a plurality of separately spaced impeller blades carried thereby, the impelling surface of said blades being entirely upward and having substantially a uniform pitch from end to end to produce a substantially uniform unshattered discharge upwardly, said blades in cross section presenting a sharp leading edge with the lower face inclined upwardly and a comparatively thick rear edge substantially at right angles to the impelling face at the outer end of the blade to form a cavitation pocket behind each blade, and means for introducing a fluid medium to the cavitation pockets formed behind the blades.

13. In an apparatus of the character described having a container for the reception of a liquid carrying a substance to be treated with a fluid medium, an impeller rotating within a housing for maintaining the liquid and the substance carried thereby in continuous circulation within the container and for introducing and mixing the fluid medium with the liquid and the substance carried thereby, said impeller comprising a center hub, a plurality of separately spaced solid impeller blades carried thereby, the impelling surface of said blades being entirely upward and having substantially a uniform path from end to end to produce a substantially uniform unshattered discharge upwardly, said blades in cross section presenting a sharp leading edge with the lower face inclined upwardly and a comparatively thick rear edge substantially at a right angle to impelling face at outer end of the blade to form a cavitation pocket between and located wholly exteriorly of each solid spaced blade, and means for introducing a fluid medium to the cavitation pockets formed behind each solid blade.

14. An apparatus of the character described comprising a container for the reception of a liquid containing a substance to be treated with a fluid medium, a stationary housing disposed within the container and submerged in the liquid, said housing having a suction opening at the bottom and a discharge at the top, an impeller in the housing whereby continuous circulation of the liquid and the substance carried thereby is maintained and whereby an introduced fluid medium is diffused, and a submerged plate disposed above the discharge opening and extending laterally beyond said opening whereby the fluids and the substance carried thereby are further diffused and uniformly distributed.

LEWIS DRIVER DRAKE.